United States Patent
Cox et al.

(10) Patent No.: US 10,763,728 B2
(45) Date of Patent: Sep. 1, 2020

(54) COOLANT DISTRIBUTOR FOR A MACHINE CONFIGURATION AND CORRESPONDING MACHINE CONFIGURATION

(71) Applicants: AUDI AG, Ingolstadt (DE); Audi Hungaria Zrt, Györ (HU)

(72) Inventors: Jason Cox, Ingolstadt (DE); Axel Pohlmann, Stammham (DE); Stefan Zucknik, Ingolstadt (DE); Zsolt Barany, Györ (HU)

(73) Assignees: AUDI AG, Ingolstadt (DE); Audi Hungaria Zrt, Györ (HU)

( * ) Notice: Subject to any disclaimer, the term of this patent is extended or adjusted under 35 U.S.C. 154(b) by 126 days.

(21) Appl. No.: 16/226,803

(22) Filed: Dec. 20, 2018

(65) Prior Publication Data
US 2019/0199170 A1     Jun. 27, 2019

(30) Foreign Application Priority Data

Dec. 21, 2017     (DE) .......................... 10 2017 223490

(51) Int. Cl.
*H02K 9/19*     (2006.01)
*H02K 5/20*     (2006.01)
(Continued)

(52) U.S. Cl.
CPC .................. *H02K 9/19* (2013.01); *B60K 1/00* (2013.01); *H02K 1/32* (2013.01); *H02K 5/20* (2013.01);
(Continued)

(58) Field of Classification Search
CPC ........ B60K 1/00; B60K 2001/001–006; H02K 1/32; H02K 9/193; H02K 9/197
(Continued)

(56) References Cited

U.S. PATENT DOCUMENTS

2013/0076169 A1     3/2013    Pal

FOREIGN PATENT DOCUMENTS

DE          10318022 A1     11/2004
DE    102008001607 A1     11/2009
(Continued)

OTHER PUBLICATIONS

The extended European search report dated Apr. 12, 2019 of corresponding European application No. 18207736.2 including partial machine-generated English language translation; 9 pages.
(Continued)

*Primary Examiner* — Tulsidas C Patel
*Assistant Examiner* — Robert E Mates
(74) *Attorney, Agent, or Firm* — Maier & Maier, PLLC

(57) ABSTRACT

A coolant distributor for a machine configuration. At least one coolant forward flow inlet opening and at least one coolant return flow outlet opening as well as multiple coolant forward flow outlet openings and multiple coolant return flow inlet openings are formed in a distributor body of the coolant distributor. The coolant forward flow inlet opening is fluidically connected by way of a forward flow chamber present in the distributor body to the coolant flow outlet openings, and the coolant return flow inlet openings are fluidically connected by way of a return flow chamber to the coolant return flow outlet opening and the coolant forward flow inlet opening is separated fluidically within the distributor body from the coolant return flow outlet opening, and wherein the distributor body is composed of two identical parts, which between them form the forward flow chamber and the return flow chamber.

10 Claims, 3 Drawing Sheets

(51) Int. Cl.
*B60K 1/00* (2006.01)
*H02K 1/32* (2006.01)
*H02K 9/197* (2006.01)

(52) U.S. Cl.
CPC ........ *H02K 9/197* (2013.01); *B60K 2001/006* (2013.01)

(58) Field of Classification Search
USPC .............................. 310/54, 58, 59, 60 A, 61
See application file for complete search history.

(56) References Cited

FOREIGN PATENT DOCUMENTS

| | | |
|---|---|---|
| DE | 202010001318 U1 | 5/2011 |
| DE | 102011015623 A1 | 10/2012 |
| DE | 112011103682 T5 | 8/2013 |
| DE | 102015122234 A1 | 6/2017 |
| FR | 3004601 A1 | 10/2014 |
| GB | 2401730 A | 11/2004 |

OTHER PUBLICATIONS

Examination Report dated Nov. 9, 2018 of corresponding German application No. 102017223490.3; 8 pages including Machine-Generated English-language Translation Attached.

COOLANT DISTRIBUTOR FOR A MACHINE CONFIGURATION AND CORRESPONDING MACHINE CONFIGURATION

FIELD

The invention relates to a coolant distributor for a machine configuration as well as a corresponding machine configuration.

BACKGROUND

From the prior art there is known, for example, the document DE 10 2008 001 607 A1. This relates to an electric machine for a vehicle, especially a motor vehicle, having a rotor with a rotor shaft and possessing a cooling device with a coolant. It is proposed that the rotor shaft is designed as a hollow shaft having an internal wall, through which coolant flows, having in its interior at least one coolant delivery element connected to the internal wall of the hollow shaft and delivering coolant by way of its rotation along with the hollow shaft.

Furthermore, the document DE 10 2011 015 623 A1 describes an electric drive unit for a motor vehicle, having an electric machine and a lubrication and cooling circuit. The lubrication and cooling circuit comprises an aqueous lubricant that is conducted at least through an internal space of the electric machine, in order to cool parts of the electric machine in the internal space.

SUMMARY

It is the object of the invention to propose a coolant distributor for a machine configuration that has advantages when compared with known coolant distributors, especially one that is easy and economical to produce and that furthermore makes possible an optimal flow guidance.

This is accomplished according to the invention with a coolant distributor for a machine configuration with the features of claim 1. In this case, it is proposed that at least one coolant forward flow inlet opening and at least one coolant return flow outlet opening as well as multiple coolant forward flow outlet openings and multiple coolant return flow inlet openings are formed in a distributor body of the coolant distributor, wherein the coolant forward flow inlet opening is fluidically connected by way of a forward flow chamber present in the distributor body to the coolant forward flow outlet openings, and the coolant return flow inlet openings are fluidically connected by way of a return flow chamber to the coolant return flow outlet opening, and the coolant forward flow inlet opening is separated fluidically within the distributor body from the coolant return flow outlet opening, and wherein the distributor body is composed of two identical parts, which between them form the forward flow chamber and the return flow chamber.

The coolant distributor forms a component of the machine configuration and serves for distributing coolant within the machine configuration. The machine configuration preferably comprises several electric machines, for example a first electric machine and a second electric machine. The two electric machines, in especially preferred manner, are present as traction machines for a motor vehicle, so that the machine configuration can also alternatively be called a drive machine configuration or a traction machine configuration. In this case, the machine configuration serves for driving a motor vehicle, i.e., for providing a torque directed at driving the motor vehicle.

During an operation of the machine configuration, heat builds up in it, which is or should be at least partially discharged. For this, a coolant is supplied to the machine configuration, which takes up heat by flowing through the machine configuration and carrying it away. The coolant distributor is provided for the dividing or distributing of the coolant within the machine configuration, especially for the dividing of the coolant to the electric machines of the machine configuration. Hence, the distributor receives a coolant forward flow and divides it into several partial coolant flows. These partial coolant flows are supplied to the individual electric machines of the machine configuration.

After flowing through the electric machines, the partial coolant flows are once again taken to the coolant distributor, which brings them together, namely, into a coolant return flow. This ultimately means that a single coolant flow, namely the coolant forward flow, is supplied to the coolant distributor, and also only a single coolant flow, namely the coolant return flow, is removed from it. The distribution of the coolant among the individual partial coolant flows or the electric machines of the machine configuration and the subsequent combining of the partial coolant flows into the coolant return flow occurs with the aid of the coolant distributor.

The coolant distributor for this purpose comprises the distributor body, in which the coolant forward flow inlet opening, the coolant return flow outlet opening, the coolant forward flow outlet openings and the coolant return flow inlet openings are formed. Through the coolant forward flow inlet opening, the coolant forward flow is supplied to the coolant distributor or the distributor body. Subsequently, the coolant forward flow is divided within the distributor body into the partial coolant flows, which are introduced into the coolant forward flow outlet openings. Preferably, one of the partial coolant flows is introduced into each of the coolant forward flow outlet openings.

The coolant forward flow outlet openings are arranged spaced apart from each other on the distributor body or are formed spaced apart from each other in it, so that the partial coolant flows run geometrically separate from each other after the distributor body. After the cooling of the machine configuration, the partial coolant flows are introduced once more via the coolant return flow inlet openings into the coolant distributor or its distributor body. Preferably, in this case, one of the partial coolant flows is supplied to each of the coolant return flow inlet openings. Inside the distributor body, the partial coolant flows are combined, namely, to form the coolant return flow. The coolant return flow is then provided at the coolant return flow outlet opening for its removal or it is discharged through the coolant return flow outlet opening from the distributor body.

The forward flow chamber and the return flow chamber serve for realizing the described functionality. By way of the forward flow chamber, the coolant forward flow inlet opening is fluidically connected to the multiple coolant forward flow outlet openings. Conversely, by way of the return flow chamber, the multiple coolant return flow inlet openings are fluidically connected to the coolant return flow outlet opening. Within the distributor body, the coolant forward flow and the coolant return flow run fluidically separate from each other. For this, the forward flow chamber and the return flow chamber are formed geometrically spaced apart from each other within the distributor body, so that they are fluidically separated from each other.

Accordingly, the coolant forward flow inlet opening is also fluidically separated from the coolant return flow outlet opening within the distributor body. Thus, a flow connection between the coolant forward flow inlet opening and the coolant return flow outlet opening does not exist, at least by way of the coolant distributor or the distributor body, and also, accordingly, is not present by way of the forward flow chamber and the return flow chamber, but can only be realized outside of the coolant distributor. Hence, the coolant forward flow inlet opening and the coolant return flow outlet opening stand in flow connection with each other for cooling the machine configuration via the electric machines of the machine configuration.

In order to realize a production of the coolant distributor that is as simple and economical as possible, the distributor body is composed of two identical parts, i.e., two elements which are formed identical to each other. Preferably, the two identical parts are placed in different orientations and put together to form the distributor body. This means, for example, that the two identical parts rest against each other in an imaginary plane, which also can be called the plane of contact, and that the two identical parts are configured symmetrically to each other with respect to this imaginary plane.

This is implemented, for example, by designing or fabricating the two identical parts identically. After this, one of the identical parts is rotated, for example, by 180°, and connected to the other of the identical parts to form the distributor body. In order to produce the distributor body, the two identical parts are preferably secured against each other, namely, in particular, secured fluidically tight against each other. This securing or fastening can basically be carried out in any desired manner, for example, a form-fitting and/or a materially bonded fastening of the two identical parts to each other can be implemented. The materially bonded fastening is realized, for example, by adhesively bonding and/or welding of the identical parts.

In order to further simplify the production of the distributor body, the two identical parts should form the forward flow chamber and the return flow chamber between them. This ultimately means that both the forward flow chamber and the return flow chamber, on the one hand are bounded by one of the identical parts, and, on the other hand, by the other of the identical parts. For this, the forward flow chamber and the return flow chamber are each open at the edge and each is in part formed in the two identical parts. The forward flow chamber and the return flow chamber thus are each composed of a recess of one identical part and a recess of the other identical part.

For example, these recesses are originally formed with the identical parts, for example during a casting process, during which the identical parts are produced. However, it may also be provided to form the recesses in the identical parts after the forming of the identical parts, once again by means of casting, for example, preferably by a chip-removing machining process, especially preferably by milling cutting.

Both procedures enable a high degree of freedom in the configuration of the forward flow chamber and the return flow chamber. The formation of the distributor body from identical parts configured symmetrically to each other thus makes possible, on the one hand, a simple and economical production, and, on the other hand, an optimal flow guidance of the coolant through the distributor body.

Another embodiment of the invention provides that the distributor body has a central hollow shaft passage opening relative to a longitudinal center axis of the distributor body, to which are connected the coolant return flow inlet openings in the radial direction on the outside. The longitudinal center axis of the distributor body preferably coincides with an axis of rotation of the coolant distributor, around which the latter is mounted rotatably in the machine configuration. For example, the coolant distributor is connected directly to drive shafts of the electric machine. These drive shafts are preferably present as hollow shafts. Accordingly, the hollow shaft passage opening is configured to receive the drive shaft or drive shafts.

The hollow shaft passage opening preferably reaches entirely through the distributor body in the axial direction with respect to the longitudinal center axis. Due to the symmetrical configuration of the identical parts, it is present in both of the identical parts. The hollow shaft passage opening is adjoined by the coolant return flow inlet openings. In the coolant distributor not installed, i.e., when no shaft has been arranged in the hollow shaft passage opening, it is preferably provided that the coolant return flow inlet openings are formed open at the edge toward the hollow shaft passage opening in the radial direction.

A fluidic separation of the hollow shaft passage opening from the coolant return flow inlet openings is accordingly ultimately achieved by the arrangement of the hollow shaft or the hollow shafts in the hollow shaft passage opening. One of the coolant return flow inlet openings is formed in each of the identical parts. The described configuration, in turn, makes possible a simple production of the distributor body of the coolant distributor.

In the context of another embodiment of the invention it may be provided that the coolant return flow inlet openings are bounded on both sides in the circumferential direction with respect to the longitudinal center axis of the distributor body. In other words, each of the coolant return flow inlet openings only partially encloses the longitudinal center axis in the circumferential direction. For example, the coolant return flow inlet openings extend in the circumferential direction for at most 45°, for at most 90°, for at most 135°, for at most 180° or for at most 225° with respect to the longitudinal center axis. This makes possible, in a simple way, a fluidic separating of the forward flow chamber and the return flow chamber from each other within the distributor body.

One preferred embodiment of the invention provides that the coolant return flow inlet openings are formed in different ones of the identical parts*. This has already been pointed out above. Usually, the same number of coolant return flow inlet openings is formed in one of the identical parts as in the other of the identical parts in each case. In other words, the coolant return flow inlet openings are uniformly divided among the identical parts, not least of all in order to make possible their configuration as identical parts. In turn, such an embodiment thus serves for the simple and economical production of the coolant distributor.

Another preferred embodiment of the invention provides that the coolant forward flow inlet opening is composed of multiple coolant forward flow inlet opening portions, each of them formed at a spacing from each other in different ones of the identical parts* and are closed at the edge, the coolant forward flow inlet opening portions passing through lateral surfaces of the identical parts. The dividing of the coolant forward flow inlet opening into the multiple coolant forward flow inlet opening portions serves for the easy fluidic connectability of the coolant distributor, while at the same time having a sufficient through-flow cross section for the coolant forward flow inlet opening. The dividing makes possible a reliable fluidic separation between coolant forward flow inlet opening and coolant return flow outlet opening. The same number of coolant forward flow inlet opening portions is formed in each of the identical parts.

In the case of identical parts mounted against each other, i.e., to form the finished distributor body, the coolant forward flow inlet opening portions are situated at a spacing from each other. Furthermore, the coolant forward flow inlet opening portions are formed closed at the edges in each case in the identical parts. This means that the coolant forward flow inlet opening portions also are open at the edges when the identical parts are arranged at a spacing from each other, and do not assume a form closed at the edges only when the identical parts are joined to form the distributor body. By a configuration closed at the edge is meant that an encircling, i.e., a continuous edge is present, entirely enclosing each of the coolant flow inlet opening portions.

Each of the identical parts has a lateral surface, which delimits the respective identical part outward in the radial direction. For example, the identical parts are cylindrical, especially circular cylindrical, and accordingly they have two preferably level base surfaces, which are joined together on the outside in the radial direction by the corresponding lateral surface. Now, at least one of the coolant forward flow inlet opening portions should be present in the lateral surface of each of the identical parts, i.e., should extend through the corresponding lateral surface, namely, with closed edge. The arrangement of the coolant forward flow inlet opening or the coolant forward flow inlet opening portions in the lateral surfaces enables a simple fluidic connection of the coolant distributor to a coolant supply.

An enhancement of the invention provides that the coolant return flow outlet opening is situated, looking in the axial direction, between the coolant forward flow inlet opening portions and is formed partially in the identical parts and open at the edge, while the coolant return flow outlet opening passes through the lateral surfaces of the identical parts. The formation of the coolant return flow outlet opening in the lateral surface of the identical parts is made such that it is present in the axial direction between the coolant forward flow inlet opening portions, and makes possible a simple connection of the coolant distributor to a coolant supply. For example, a connection piece of the coolant supply lies continuously against the lateral surfaces of the identical parts and has two recesses fluidically connected to the coolant forward flow inlet opening portions and a recess situated between them, fluidically connected to the coolant return flow outlet opening.

It should be noted that the coolant return flow outlet opening should only be present between the coolant forward flow inlet opening portions looking in the axial direction. For this, it is not necessary, nor, preferably, is it provided that the coolant return flow outlet opening and the coolant forward flow inlet opening portions are situated overlapping in the circumferential direction. Instead, they are preferably formed at a spacing from each other in the circumferential direction.

Another preferred embodiment of the invention provides that the return flow chamber widens out in its radial course in the circumferential direction, starting from the coolant return flow inlet openings, toward the coolant return flow outlet opening. Thus, the coolant return flow inlet openings are situated further to the inside, looking in the radial direction, than the coolant return flow outlet opening, which conversely is situated further to the outside than the coolant return flow inlet openings. The coolant return flow inlet openings, on the one hand, and the coolant return flow outlet opening are joined together fluidically by way of the return flow chamber. Preferably, the coolant return flow outlet opening is formed by the lateral surface of the identical parts extending through the return flow chamber.

An especially advantageous flow guidance of the coolant with especially low flow losses is realized by the widening of the return flow chamber in the radial direction, such that it becomes larger toward the outside in the radial direction, namely, its extent becomes increasingly larger in the circumferential direction. It may be provided that the return flow chamber widens continuously, i.e., grows continuously larger proceeding outward in the radial direction, starting from the coolant return flow inlet openings and reaching to the coolant return flow outlet opening. However, it may also be provided that at first a widening of the return flow chamber is present, starting from the coolant return flow inlet openings, and then the return chamber becomes smaller once more in the circumferential direction.

Preferably, however, the coolant return flow outlet opening is always larger in angle dimension in the circumferential direction than the coolant return flow inlet openings, or at least it is exactly the same. Especially preferred, the return flow chamber is configured so that a rotational movement of the coolant distributor or the distributor body about the axis of rotation or the longitudinal center axis brings about a delivery effect on the coolant, forcing it in the direction of the coolant return flow outlet opening.

Another especially preferred embodiment of the invention provides that a flow guidance element is situated in the return flow chamber, resting against both identical parts in the axial direction, and it extends from the coolant return flow inlet openings to the coolant return flow outlet opening, so that a portion of the return flow chamber is fluidically separated from the coolant return flow inlet openings. The flow guidance element ensures a reducing of the flow resistance or the pressure loss of the coolant when flowing through the return flow chamber. At the same time, it may be configured such that a rotational movement of the distributor body exerts a delivery effect on the coolant in the direction of the coolant return flow outlet opening. In particular, however, the return flow chamber will be reduced in size with the aid of the flow guidance element.

Based on the design of the distributor body made of two identical parts which together form the return flow chamber, the return flow chamber has a large volume in a flow-optimized design, especially due to a large extent in the circumferential direction. This is because of the configuration of the distributor body made of the two identical parts symmetrically with respect to an imaginary plane of symmetry situated on the longitudinal center axis. In order to make the return flow chamber smaller, the flow guidance element should rest against the identical parts on opposite situated sides so that it divides the return flow chamber into two parts. The flow guidance element is situated such that one part of the return flow chamber is fluidically separated from the coolant return flow inlet openings, i.e., at least it does not stand in fluidic connection with it by way of the distributor body. Reducing the volume size of the return flow chamber accomplishes a smaller pressure loss by way of the return flow chamber.

Finally, in the context of another preferred embodiment of the invention, it can be provided that the flow guidance element is curved in the circumferential direction. In other words, the flow guidance element has a curvature in the circumferential direction that is different from zero at least in regions, and more preferably continuously, over the flow guidance element in the radial direction. For example, the flow guidance element has a constant curvature other than zero over its extent in the radial direction. However, it may also be provided that the curvature changes in the radial direction over the extent of the flow guidance element, in particular, changes continuously.

The flow guidance element, for example, is curved such that it has a delivery effect on the coolant present in the return flow chamber in the event of a rotational movement of the distributor body about its axis of rotation. Thus, while the distributor body is describing a rotational movement, the coolant is delivered out from the return flow chamber by virtue of the curvature of the flow guidance element, namely, in the direction of the coolant return flow outlet opening.

The invention furthermore relates to a machine configuration. This configuration encompasses a first electric machine and a second electric machine, each comprising a first hollow shaft and a second hollow shaft protruding into the first hollow shaft, which are fluidically connected to a coolant distributor designed according to the embodiments in this description, wherein each of the electric machines comprises a respective coolant duct which is present partially in the respective second hollow shaft and formed partially by an annular space present between an inner circumference of the respective first hollow shaft and an outer circumference of the respective second hollow shaft.

The advantages of such a design of the machine configuration or the coolant distributor have already been pointed out. Both the machine configuration and the coolant distributor may be enhanced according to the statements in the course of this description, so that reference is made to them in this regard.

The machine configuration comprises the two electric machines, each of them having two hollow shafts, namely, the first hollow shaft and the second hollow shaft. Accordingly, the first electric machine has the first hollow shaft and the second hollow shaft and the second electric machine has another first hollow shaft and another second hollow shaft. The first hollow shaft preferably constitutes a drive shaft of the respective electric machine, i.e., it serves for transmitting a torque provided by the respective electric machine. The second hollow shaft, on the other hand, serves for forming the coolant duct and it extends into the first hollow shaft.

Although the second hollow shaft is connected to the first hollow shaft in a rotationally fixed manner, it does not serve for the transmittal of the torque. Instead, it ends inside the first hollow shaft at its end facing away from the coolant distributor. The second hollow shaft is thus present as a kind of cooling lance, through which coolant can be introduced into an interior space of the first hollow shaft. Accordingly, each of the electric machines has a coolant duct, which is present partly in the respective second hollow shaft, i.e., the cooling lance.

In another portion, the coolant duct is situated between the inner circumference of the first hollow shaft and the outer circumference of the second hollow shaft, namely, in the annular space formed by the arrangement of the second hollow shaft in the first hollow shaft, in between them. Preferably, coolant is introduced by means of the coolant distributor into the second hollow shaft, flows through it, and emerges from the second hollow shaft at its side facing away from the coolant distributor. From here, the coolant flows back to the coolant distributor through the annular space present between the two hollow shafts. Accordingly, the second hollow shaft is fluidically connected to one of the coolant forward flow outlet openings of the coolant distributor. The annular space, on the other hand, is fluidically connected to one of the coolant return flow inlet openings.

BRIEF DESCRIPTION OF THE DRAWINGS

The invention shall be explained more closely below with the aid of exemplary embodiments represented in the drawing, without this limiting the invention. There are shown.

DETAILED DESCRIPTION

Figure 1:
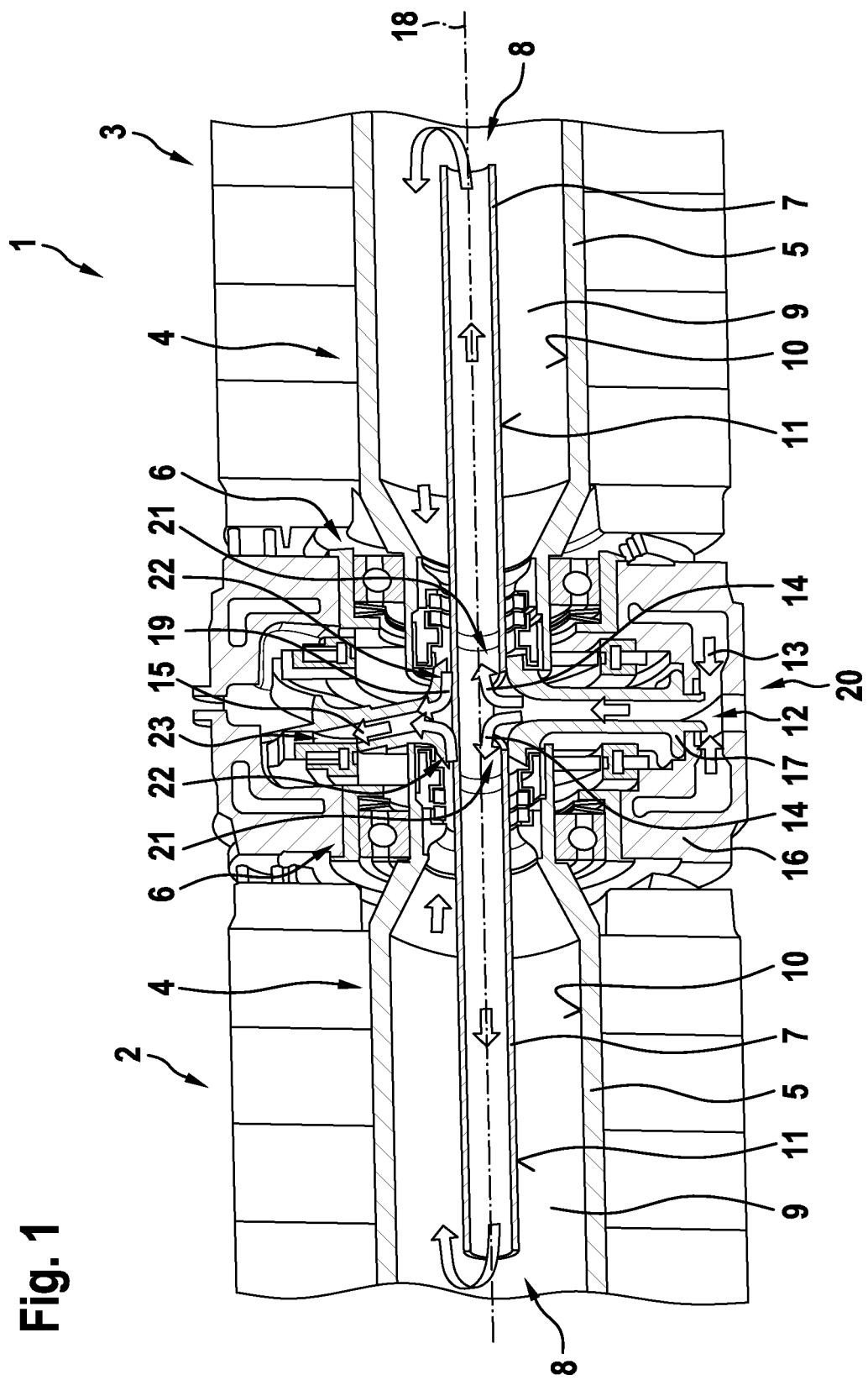
FIG. 1 a schematic representation of a machine configuration with a first electric machine and a second electric machine, as well as a coolant distributor for distributing coolant between the two electric machines.

FIG. 1 shows a schematic sectional representation of a machine configuration 1 having a first electric machine 2 and a second electric machine 3. In the following, only the first electric machine 2 will be discussed. However, the remarks are always analogously applicable to the second electric machine 3 as well. The electric machine 2 comprises a rotor 4, which is connected in a rotationally fixed manner to a first hollow shaft 5, which may also be called a drive shaft. By the first hollow shaft 5, which is mounted rotatably by means of at least one bearing 6, a torque provided by one of the electric machines 2 can be transmitted. Based on the substantially identical layout of the two electric machines 2 and 3, the individual elements of the electric machines 2 and 3 are provided with identical reference numbers.

Protruding into the first hollow shaft 5 is a second hollow shaft 7, which may also alternatively be called a cooling lance. The second hollow shaft 7 forms part of a coolant duct 8. Coolant can be led through the second hollow shaft 7 and brought into the first hollow shaft 5. In addition to a portion of the coolant duct 8 that is present in the second hollow shaft 7, the coolant duct 8 has a portion that is formed by an annular space 9, situated between an inner circumference 10 of the first hollow shaft 5 and an outer circumference 11 of the second hollow shaft.

In order to apportion coolant supplied to the machine configuration 1 among the two electric machines 2 and 3 and hence in these provided coolant ducts 8, a coolant distributor 12 is provided. The coolant distributor 12 serves for dividing a coolant forward flow 13 into multiple partial coolant flows 14, one such partial coolant flow 14 being supplied to each coolant duct 8. After flowing through the coolant duct 8, the partial coolant flows 14 are once again supplied to the coolant distributor 13 and from here they are collected into a coolant return flow 15 and discharged. The coolant distributor 12 is preferably connected in a rotationally fixed manner to the first hollow shaft 5 or the first hollow shafts 5. However, it may also be provided that the coolant distributor 12 is situated fixed in place with respect to a housing 16 of the machine configuration 1.

It can be recognized that the coolant distributor 12 comprises a distributor body 17, having a central hollow shaft passage opening 19 with respect to a longitudinal center axis 18 of the distributor body 17, through which the second hollow shaft 7 or the second hollow shafts 7 extend. In the exemplary embodiment represented here, the two second hollow shafts 7 are designed as a common hollow shaft and accordingly they extend jointly through the hollow shaft passage opening 19 of the distributor body 17.

The coolant distributor 12 possesses a coolant forward flow inlet opening 20, through which coolant can be supplied to the distributor body 17. The supplied coolant can arrive through multiple coolant forward flow outlet openings 21 into the coolant duct 8. After this through flow, the coolant once again enters the distributor body 17 through coolant return flow inlet openings 22 and is carried away from it in the form of the coolant return flow through a coolant return flow outlet opening 23.

Figure 2:
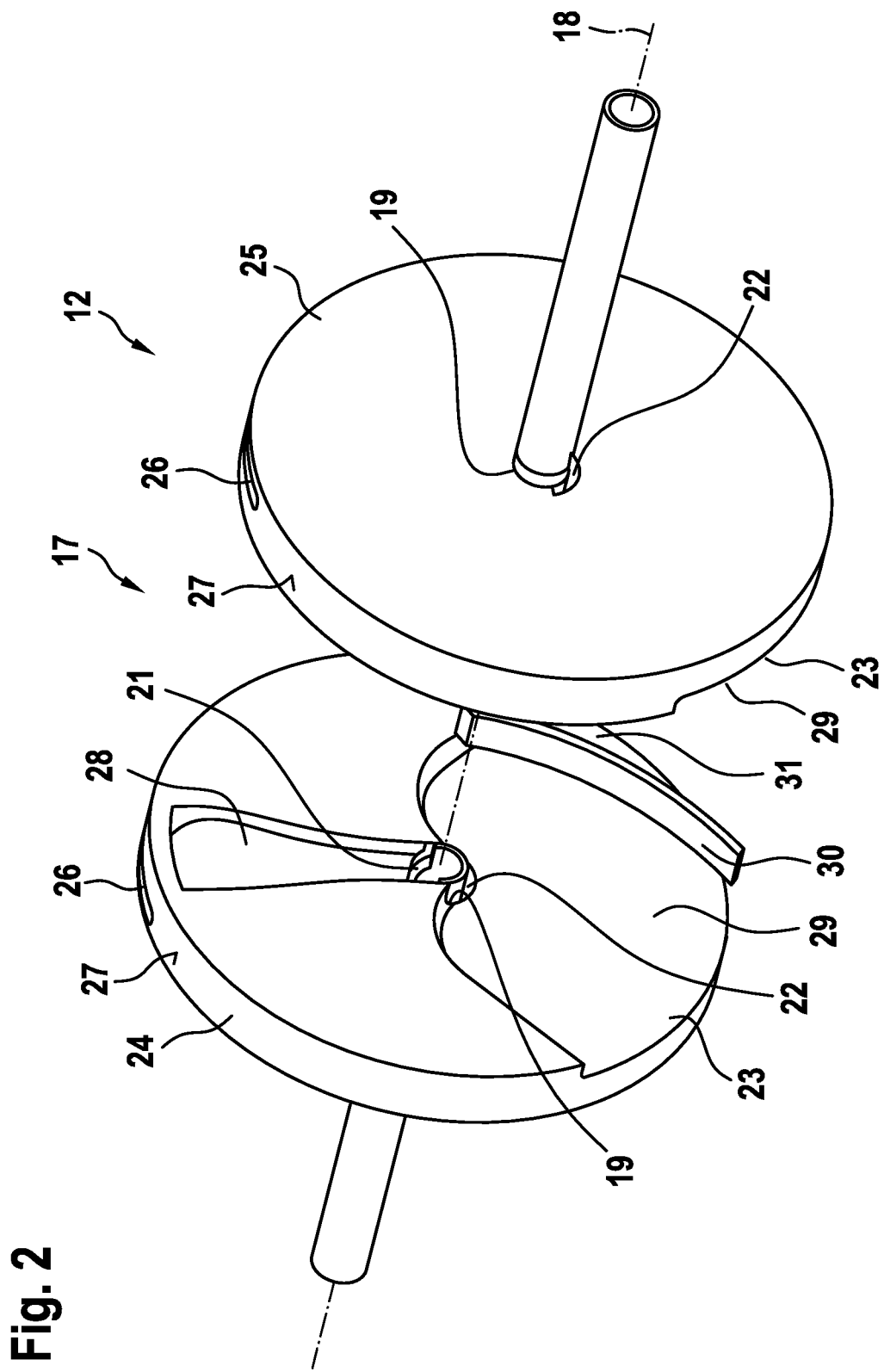
FIG. 2 a schematic exploded representation of the coolant distributor, having at least two identical parts and—optionally—a flow guidance element situated between the identical parts; as well as FIG. 3 a partly transparent further representation of the coolant distributor.

FIG. 2 shows an exploded representation of the coolant distributor 12. It is evident that the distributor body 17 is composed of two identical parts 24 and 25, which are fastened against each other to form the distributor body 17, being preferably in flat bearing contact in a plane of contact standing perpendicular to the longitudinal center axis 18. The coolant forward flow inlet opening 20 is composed of two coolant forward flow inlet opening portions 26, which are formed at a spacing from each other in the axial direction and are closed at the edge in the identical parts 24 and 25. The coolant forward flow inlet opening portions 26 reach through a lateral surface 27 of the respective identical part 24 or 25.

The coolant forward flow inlet opening 20 or its coolant forward flow inlet opening portions 26 are fluidically connected to the coolant forward flow outlet openings 21 by way of a forward flow chamber 28. The coolant return flow inlet openings 22 are formed immediately adjacent to the hollow shaft passage opening 19 and open at the edges toward it. They empty into a return flow chamber 29, by which they stand in flow connection with the coolant return flow outlet opening 23. In particular, the coolant return flow outlet opening 23 is formed by the lateral surface 27 reaching through the return flow chamber 29.

Due to the design of the coolant distributor 12 from identical parts 24 and 25, the return flow chamber 29 is very large in terms of its flow volume. For this reason, a flow guidance element 30 is arranged in the return flow chamber 29, preferably composed of a material that is different from the material of the identical parts 24 and 25. The flow guidance element 30 is braced, on the one hand, against the identical part 24 and, on the other hand, against the identical part 25, looking in the axial direction.

The flow guidance element 30 is arranged in the return flow chamber 29 in such a way that a portion 31 of the return flow chamber 29 is separated from the coolant return flow inlet openings 22. Thus, the flow guidance element 30 bounds them off fluidically with respect to the portion of the return flow chamber 29. Furthermore, the flow guidance element 30 is curved in the circumferential direction. With such a configuration, a delivery effect is exerted on the coolant, namely, during the operation of the machine configuration 1, wherein the distributor body 17 or the coolant distributor 12 rotates about the longitudinal center axis 18.

Figure 3:
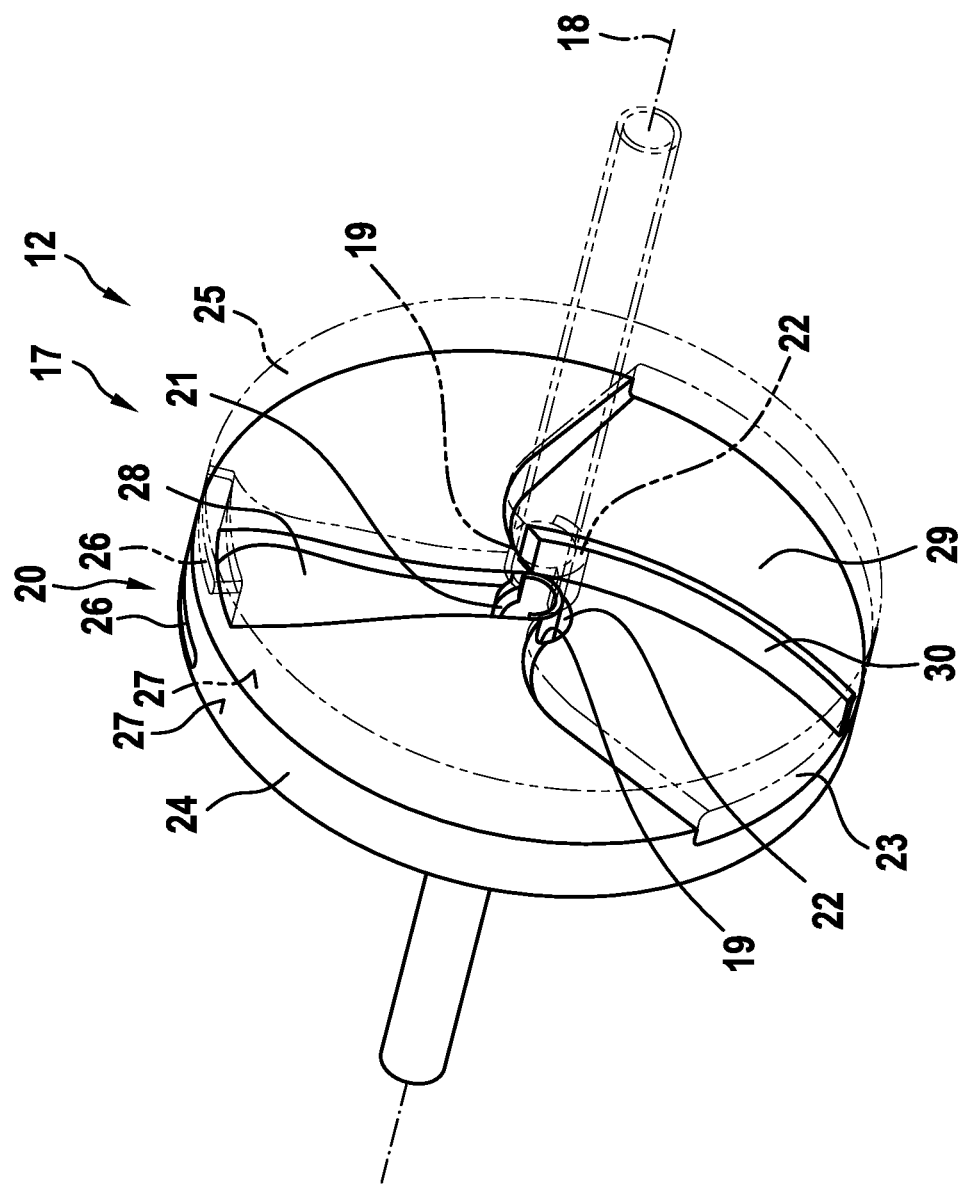

FIG. 3 shows a partly transparent representation of the coolant distributor 12. It becomes clear that the two identical parts 24 and 25 are entirely identical in configuration and lie flat against each other once joined to form the distributor body 17 in an imaginary plane, namely, a plane of contact.

The embodiment of the machine configuration 1 or the coolant distributor 12 depicted here has the advantage that it is easy and economical to produce, on the one hand, and it realizes an excellent flow guidance of the coolant, on the other hand, so that only slight pressure losses occur when coolant flows through it.

The invention claimed is:

1. A coolant distributor for a machine configuration, comprising:
at least one coolant forward flow inlet opening and at least one coolant return flow outlet opening as well as multiple coolant forward flow outlet openings and multiple coolant return flow inlet openings are formed in a distributor body of the coolant distributor, wherein the coolant forward flow inlet opening is fluidically connected by way of a forward flow chamber present in the distributor body to the coolant forward flow outlet openings, and the coolant return flow inlet openings are fluidically connected by way of a return flow chamber to the coolant return flow outlet opening, and the coolant forward flow inlet opening is separated fluidically within the distributor body from the coolant return flow outlet opening, and wherein the distributor body is composed of two identical parts, which between them form the forward flow chamber and the return flow chamber.

2. The coolant distributor as claimed in claim 1, wherein the distributor body has a central hollow shaft passage opening relative to a longitudinal center axis of the distributor body, this passage opening being connected on an outside to the coolant return flow inlet openings in a radial direction.

3. The coolant distributor as claimed in claim 1, wherein the coolant return flow inlet openings are bounded on both sides in a circumferential direction with respect to a longitudinal center axis of the distributor body.

4. The coolant distributor as claimed in claim 1, wherein the coolant return flow inlet openings are formed in different ones of the identical parts.

5. The coolant distributor as claimed in claim 1, wherein the coolant forward flow inlet opening is composed of multiple coolant forward flow inlet opening portions, each of them formed at a spacing from each other in different ones of the identical parts and are closed at an edge, wherein the coolant forward flow inlet opening portions pass through lateral surfaces of the identical parts.

6. The coolant distributor as claimed in claim 5, wherein the coolant return flow outlet opening is situated, looking in an axial direction, between the coolant forward flow inlet opening portions, and, in each case, is formed partially in the identical parts and open at the edge, wherein the coolant return flow outlet opening passes through the lateral surfaces of the identical parts.

7. The coolant distributor as claimed in claim 1, wherein the return flow chamber widens out in a radial course in a circumferential direction, starting from the coolant return flow inlet openings, toward the coolant return flow outlet opening.

8. The coolant distributor as claimed in claim 1, wherein a flow guidance element is situated in the return flow chamber, resting against both identical parts in an axial direction, and the flow guidance element extends from the coolant return flow inlet openings up to the coolant return flow outlet opening, so that a portion of the return flow chamber is fluidically separated from the coolant return flow inlet openings.

9. The coolant distributor as claimed in claim 8, wherein the flow guidance element is curved in a circumferential direction.

10. A machine configuration, comprising:
a first electric machine and a second electric machine, each having a first hollow shaft and a second hollow shaft protruding into the first hollow shaft, which are fluidically connected to a coolant distributor designed according to claim 1, wherein each of the electric machines comprises a coolant duct that is present partially in the respective second hollow shaft and formed partially by an annular space present between an inner circumference of the respective first hollow shaft and an outer circumference of the respective second hollow shaft.

* * * * *